(12) United States Patent
Clemens et al.

(10) Patent No.: US 12,471,962 B2
(45) Date of Patent: Nov. 18, 2025

(54) MODULAR BONE SCREW FIXATION SYSTEM

(71) Applicant: NEXXT Spine, LLC, Noblesville, IN (US)

(72) Inventors: Austin Clemens, Denver, CO (US); Andrew Elsbury, McCordsville, IN (US); Benjamin Lewson, Indianapolis, IN (US); Caleb Morin, Fortville, IN (US)

(73) Assignee: Nexxt Spine, LLC, Noblesville, IN (US)

( * ) Notice: Subject to any disclaimer, the term of this patent is extended or adjusted under 35 U.S.C. 154(b) by 184 days.

(21) Appl. No.: 18/172,679

(22) Filed: Feb. 22, 2023

(65) Prior Publication Data
US 2024/0277379 A1    Aug. 22, 2024

(51) Int. Cl.
*A61B 17/70*    (2006.01)
(52) U.S. Cl.
CPC ...... *A61B 17/7037* (2013.01); *A61B 17/7032* (2013.01)
(58) Field of Classification Search
CPC .................. A61B 17/7035; A61B 17/7037
See application file for complete search history.

(56) References Cited

U.S. PATENT DOCUMENTS 5,207,678 A    5/1993    Harms
5,360,431 A    11/1994   Puno
(Continued)

FOREIGN PATENT DOCUMENTS

| ES | 2 525 046 T3 | 12/2014 |
|----|--------------|---------|
| ES | 2 539 388 T3 | 6/2015  |
| ES | 2 548 580 T3 | 10/2015 |

OTHER PUBLICATIONS

International Search Report and Written Opinion in corresponding application PCT/US2024/015793, dated Jul. 18, 2024. (14 pages).

*Primary Examiner* — Julianna N Harvey
(74) *Attorney, Agent, or Firm* — Maginot, Moore & Beck LLP

(57) ABSTRACT

A fixation system includes a rod, a fastener with a spherical head, a tulip housing and a cap within the tulip housing. The housing includes a pair of arms that define a rod channel, and each arm defines an upper locking opening and a lower locking opening, all of which open to the interior of the housing. The cap includes a main body defining a spherical cavity for receiving the spherical head of the fastener, and a plurality of legs that can flex to receive the spherical head and to clamp the spherical head within ta conical bore of the tulip housing. The cap includes a pair of wings with locking tabs, each locking tab configured to engage a corresponding upper and lower locking opening. When the tabs are engaged in the upper locking openings, the cap is in an unlocked state in which the spherical head of the fastener can be introduced into the spherical cavity of the cap from the bottom of the tulip housing. The cap is then moved downward within the housing until the tabs engage the lower locking openings, so that the cap is in its locking state, with the head of the fastener locked within the housing. The cap includes spring elements between the main body and the plurality of legs that allows the main body to be moved axially toward the legs when the rod is tightened within the housing.

17 Claims, 8 Drawing Sheets

(56) References Cited

U.S. PATENT DOCUMENTS

| | | |
|---|---|---|
| 5,443,467 A | 8/1995 | Biedermann |
| 5,476,464 A | 12/1995 | Metz-Stavenhagen |
| 5,496,321 A | 3/1996 | Puno |
| 5,554,157 A | 9/1996 | Errico |
| 5,672,176 A | 9/1997 | Biedermann |
| 5,690,630 A | 11/1997 | Errico |
| 5,733,286 A | 3/1998 | Errico |
| 5,782,833 A | 7/1998 | Haider |
| 5,797,911 A | 8/1998 | Sherman |
| 5,810,819 A | 9/1998 | Errico |
| 5,863,293 A | 1/1999 | Richelsoph |
| 5,879,350 A | 3/1999 | Sherman |
| 5,910,142 A | 6/1999 | Tatar |
| 5,964,760 A | 10/1999 | Richelsoph |
| 5,989,250 A | 11/1999 | Wagner |
| 6,010,503 A | 1/2000 | Richelsoph |
| 6,053,917 A | 4/2000 | Sherman |
| 6,261,287 B1 | 7/2001 | Metz-Stavenhagen |
| 6,355,040 B1 | 3/2002 | Richelsoph |
| 6,540,748 B2 | 4/2003 | Lombardo |
| 6,565,565 B1 | 5/2003 | Yuan |
| 6,740,086 B2 | 5/2004 | Richelsoph |
| 7,261,714 B2 | 8/2007 | Richelsoph |
| 8,100,946 B2 | 1/2012 | Strausbaugh |
| 8,221,472 B2 | 7/2012 | Peterson |
| 8,663,292 B2 | 3/2014 | Dec |
| 9,198,694 B2 | 12/2015 | Mishra et al. |
| 9,241,737 B2 | 1/2016 | Biedermann et al. |
| 9,326,796 B2 | 5/2016 | Harvey et al. |
| 9,655,656 B2 | 5/2017 | Whipple |
| 9,700,355 B2 * | 7/2017 | Longtain ............ A61B 17/7001 |
| 10,130,395 B2 | 11/2018 | Leff et al. |
| 10,172,647 B2 * | 1/2019 | Elsbury ............ A61B 17/7037 |
| 10,485,594 B2 | 11/2019 | Toon et al. |
| 11,154,331 B2 | 10/2021 | Toon et al. |
| 11,219,472 B2 | 1/2022 | Abu-Mulaweh et al. |
| 11,331,124 B2 | 5/2022 | Toon et al. |
| 2004/0073218 A1 | 4/2004 | Dahners |
| 2004/0267264 A1 | 12/2004 | Konieczynski |
| 2006/0293659 A1 | 12/2006 | Alvarez |
| 2007/0118123 A1 | 5/2007 | Strausbaugh |
| 2007/0270813 A1 | 11/2007 | Garamszegi |
| 2008/0161859 A1 | 7/2008 | Nilsson |
| 2008/0183215 A1 | 7/2008 | Altarac |
| 2008/0243193 A1 | 10/2008 | Ensign |
| 2008/0294202 A1 | 11/2008 | Peterson |
| 2009/0105770 A1 | 4/2009 | Berevoets |
| 2009/0254125 A1 | 10/2009 | Predick |
| 2009/0270916 A1 | 10/2009 | Ramsay |
| 2010/0063552 A1 | 3/2010 | Chin |
| 2010/0094344 A1 | 4/2010 | Trieu |
| 2010/0179602 A1 | 7/2010 | Dauster |
| 2010/0234902 A1 * | 9/2010 | Biedermann ...... A61B 17/7037 606/305 |
| 2011/0046683 A1 | 2/2011 | Biedermann |
| 2011/0160779 A1 | 6/2011 | Schlaepfer |
| 2012/0035670 A1 | 2/2012 | Jackson et al. |
| 2012/0310284 A1 * | 12/2012 | Gerchow ............ A61B 17/7037 606/264 |
| 2013/0150852 A1 * | 6/2013 | Shluzas .................. A61B 17/70 606/65 |
| 2013/0338721 A1 * | 12/2013 | Biedermann ...... A61B 17/7034 606/305 |
| 2014/0025119 A1 * | 1/2014 | Biedermann ...... A61B 17/7035 606/266 |
| 2014/0188175 A1 * | 7/2014 | Mishra ............ A61B 17/7037 606/279 |
| 2016/0151094 A1 * | 6/2016 | Biedermann ...... A61B 17/7035 606/266 |
| 2016/0262803 A1 * | 9/2016 | Nelson ............ A61B 17/7032 |
| 2016/0361095 A1 | 12/2016 | Burdi et al. |
| 2017/0086886 A1 | 3/2017 | Duncan et al. |
| 2017/0112542 A1 * | 4/2017 | Biedermann ...... A61B 17/7032 |
| 2017/0172630 A1 * | 6/2017 | Biedermann ...... A61B 17/7035 |
| 2017/0209184 A1 * | 7/2017 | Fiechter ............ A61B 17/7032 |
| 2019/0192192 A1 * | 6/2019 | Biedermann ...... A61B 17/7032 |
| 2022/0071665 A1 | 3/2022 | Toon et al. |
| 2022/0240988 A1 | 8/2022 | Toon et al. |

\* cited by examiner

MODULAR BONE SCREW FIXATION SYSTEM

BACKGROUND

The present invention relates to implant fixation systems, and particularly to systems for engaging an elongated member, such as a spinal rod, to a bone. The invention further pertains to a system utilizing a poly- or multi-axial bone fastener.

In many orthopaedic procedures, an implant is fixed to a bone to stabilize the bone. One example is for stabilization of a spinal segment. In one type of spinal fixation system, an elongated stabilization member, such as a spinal rod, is engaged to adjacent vertebrae by a bone engaging member. The bone engaging member is typically a hook configured to engage certain portions of the vertebral anatomy, or a bone screw adapted to be threaded into vertebral bone.

In orthopaedic stabilization systems, and most particularly in spinal systems, there is a need to accommodate various angular orientations between the elongated member and the spinal segment. This necessarily requires an ability to achieve variable angles between the bone engaging member and the elongated stabilization member. In the simplest case, the variable angle is in a single plane. In more complex cases, multi- or poly-axial angular orientations are required. One form of spinal stabilization system utilizes a bone screw having a generally spherically-shaped head. The screw head is seated within a mating cavity in a yoke. The yoke includes opposite arms forming a U-shaped slot for receipt of a spinal rod above the screw head.

Various mechanisms have been developed to lock the screw head and the rod within the yoke. In one such system, an insert is disposed between the bone screw head and the spinal rod. A set screw threaded into the arms of the yoke presses the rod into the insert, which presses the screw head into the yoke cavity. When fully tightened, the set screw effectively locks all of the components of the stabilization assembly together. The strength or tightness of this fixation requires that all of the components be properly oriented, otherwise no amount of tightening of the set screw will fully lock the assembly together. Since the components of the fixation system are typically assembled in situ, the surgeon's ability to visualize the instrumentation is limited.

There was a need for an implant fixation system that can provide assurances to the surgeon that the components are properly situated so that the components can be effectively locked together when the instrumentation is complete. Such a fixation system is disclosed in U.S. Pat. No. 10,172,647, which issued to the present applicant on Jan. 8, 2019. Components of the system are shown in FIGS. 7-8, which correspond to FIGS. 3 and 7 of the '647 patent. The system includes an elongated rod R, a fastener B including a head H and an elongated shank having a bone engaging portion, and a fixation assembly 110 that includes a yoke 114, an insert 118 and a set screw S. The yoke 114 includes a base portion 130 with opposite arms 136 extending therefrom to define a slot sized for receiving the rod therein. The base portion defines an opening in communication with the slot sized to receive the shank of the fastener B therethrough and a surface adjacent the opening for supporting the head H of the fastener B. In one feature, the yoke 114 further defines a cross bore 144 through each of the arms 136.

The insert 118 includes a base 150 configured for slidable insertion between the arms of the yoke 114. The base defines a rod supporting surface 156 configured to support the rod R thereon and an opening 151 sized to receive the shank of the fastener B therethrough. In a further feature, the insert includes a pair of resiliently deflectable fingers 162 extending from the base, and together with side walls 154 define a slot 158 configured to receive the rod therebetween. The fingers and side walls can define a curved surface 160 to contact the rod R. Each of the resiliently deflectable fingers 162 include a tab 166 projecting outwardly therefrom and configured to be received within a cross bore 144 in a corresponding one of the arms of the yoke. Each tab defines a beveled face configured to bear against the opposite arms of the yoke as the insert is advanced into the slot of the yoke to deflect the resiliently deflectable fingers toward each other until the insert is advanced far enough into the yoke for the tabs to align with the cross bores in the arms of the yoke. Once the tabs 166 are aligned with the cross bores 144, the resiliently deflectable arms 162 deflect outward to their natural configuration so that the tabs engage the cross bores. The resiliently deflectable fingers and tabs provide a tactile feel and an audible indication when the insert is fully disposed within the yoke. The fingers are further configured to engage the rod within the insert and yoke to form a stable fixation assembly. The foregoing provides a brief explanation of the structure of the fixation system disclosed in the '647 patent. The entire disclosure of the '647 patent is incorporated herein by reference.

While the fixation system of the '647 patent represents an improvement in the art, there is still a need to provide a fixations system that increases the flexibility and usability for the surgeon, while retaining the tactile aspect of the system of the '647 patent.

SUMMARY OF THE DISCLOSURE

A fixation assembly is provided for fixing a spinal rod to a bone engaging fastener with a set screw. The fastener has a spherical head. The assembly includes a tulip housing with an inner circumferential wall that extends to a conically tapered wall at an opening at one end of the housing. The opening is configured to receive the spherical head of the fastener therethrough. The housing further includes a pair of arms at an opposite end of the housing that define a rod channel therebetween configured to receive the spinal rod therein. The arms further include an upper inner surface that merges into the circumferential wall and that includes internal threads configured for threaded engagement with the set screw. In one feature of the fixation assembly, a pair of upper locking openings and a pair of lower locking openings are defined in each of the arms.

The fixation assembly further comprises a cap that is configured for insertion into the tulip housing from the one end. The cap includes a main body that defines a spherical cavity sized to receive the spherical head of the fastener therein, and a saddle configured to receive the spinal rod therein when the rod is disposed within the rod channel of the housing. The cap further includes a plurality of legs extending from one end of the main body that are separated by slots so that the plurality of legs can pivot relative to the main body. The plurality of legs each include an inner surface configured to engage the spherical head of the fastener when the spherical head is disposed within the spherical cavity, and an outer surface configured to engage the conically tapered wall of the tulip housing.

In one feature of the assembly, a pair of resiliently deflectable wings extend from an opposite end of the main body, each of the wings including an outwardly projecting locking tab at a free end thereof. Each locking tab is configured to engage a corresponding opening of the pair of upper and lower locking openings. The tulip housing and cap are thus configured so that the cap can move within the housing from an unlocked state in which the locking tab of each of the pair of wings is engaged in a corresponding opening of the upper locking openings, to a locked state in which the locking tab of each of the pair of wings is engaged in a corresponding opening of the lower locking openings.

In a further feature of the fixation assembly, the cap can include spring elements between the main body of the cap and the plurality of legs. The spring elements facilitate the inward and outward pivoting or flexing of the legs to receive the spherical head of the fastener and to lock the cap onto the spherical head. In addition, the spring elements allow the main body of the cap to translate toward the legs under pressure from the rod bearing on the cap as the set screw is tightened onto the rod. The spherical cavity of the cap can define a pair of circumferential edges that dig into the spherical head of the fastener when the cap is translated toward the legs.

DETAILED DESCRIPTION

Figure 1:
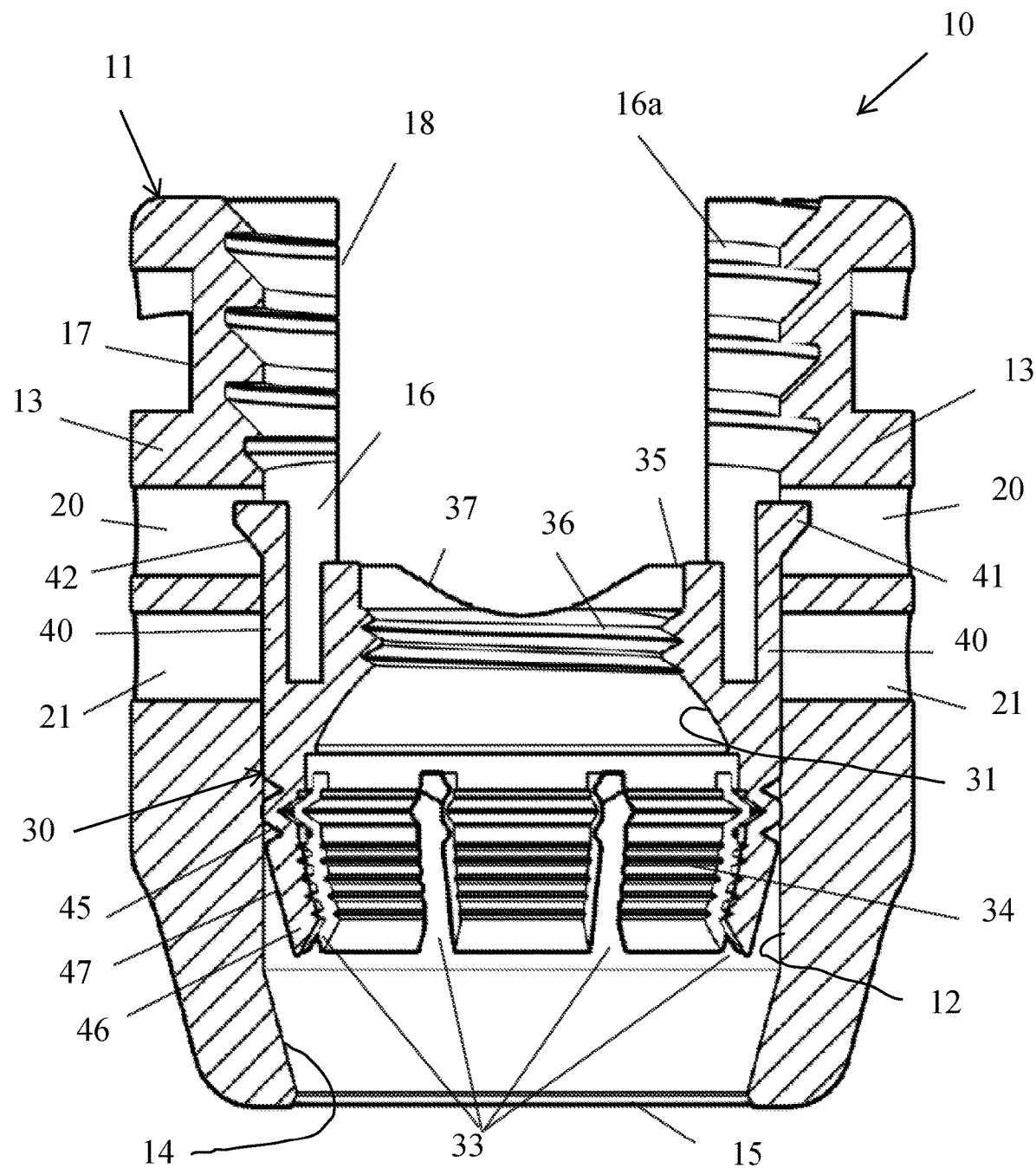
FIG. 1 is a side cut-away view of a fixation assembly according to the present disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

A fixation assembly 10 according to the present disclosure includes a yoke or tulip housing 11 defining an inner circumferential wall 12 that extends to a conically tapered wall 14 at an opening 15 through which a fastener extends, as shown in FIG. 1. The fastener can be a conventional poly-axial fastener, such as the bone screw B shown in FIG. 4B. The fastener B includes a spherical head H that accommodates poly-axial movement of the fastener when it is disposed within the assembly 10. The opening 15 is sized to receive the spherical head H inserted from the bottom of the housing 11, as described in more detail herein.

The housing 11 includes a pair of arms 13 at the top end of the housing that define a rod channel 18 therebetween. The arms further define an upper inner surface 16 that merges into the circumferential wall 12 and that includes internal threads 16a. The internal threads 16 are configure to accept a set screw to complete the fixation assembly. The arms 13 can also define external recesses 17 for engagement by an insertion tool. As thus far described, the tulip housing 11 is similar to tulip housings of the prior art. In accordance with the present disclosure, the tulip housing defines a pair of upper locking openings 20 that extend through each of the arms 13. A second pair of lower locking openings 21 are defined in the tulip housing, preferably also in the arms 13. The locking openings 20, 21 are configured for engagement by locking features of the cap 30 that is introduced into the tulip housing 11, as described below. In the illustrated embodiment, the openings 20, 21 are in the form of bores passing through the arms 13 and through the inner wall 12, in communication with the rod channel 18. Alternatively, the openings 20, 21 can be defined as recesses in the upper inner surface of the pair of arms.

Figure 2:
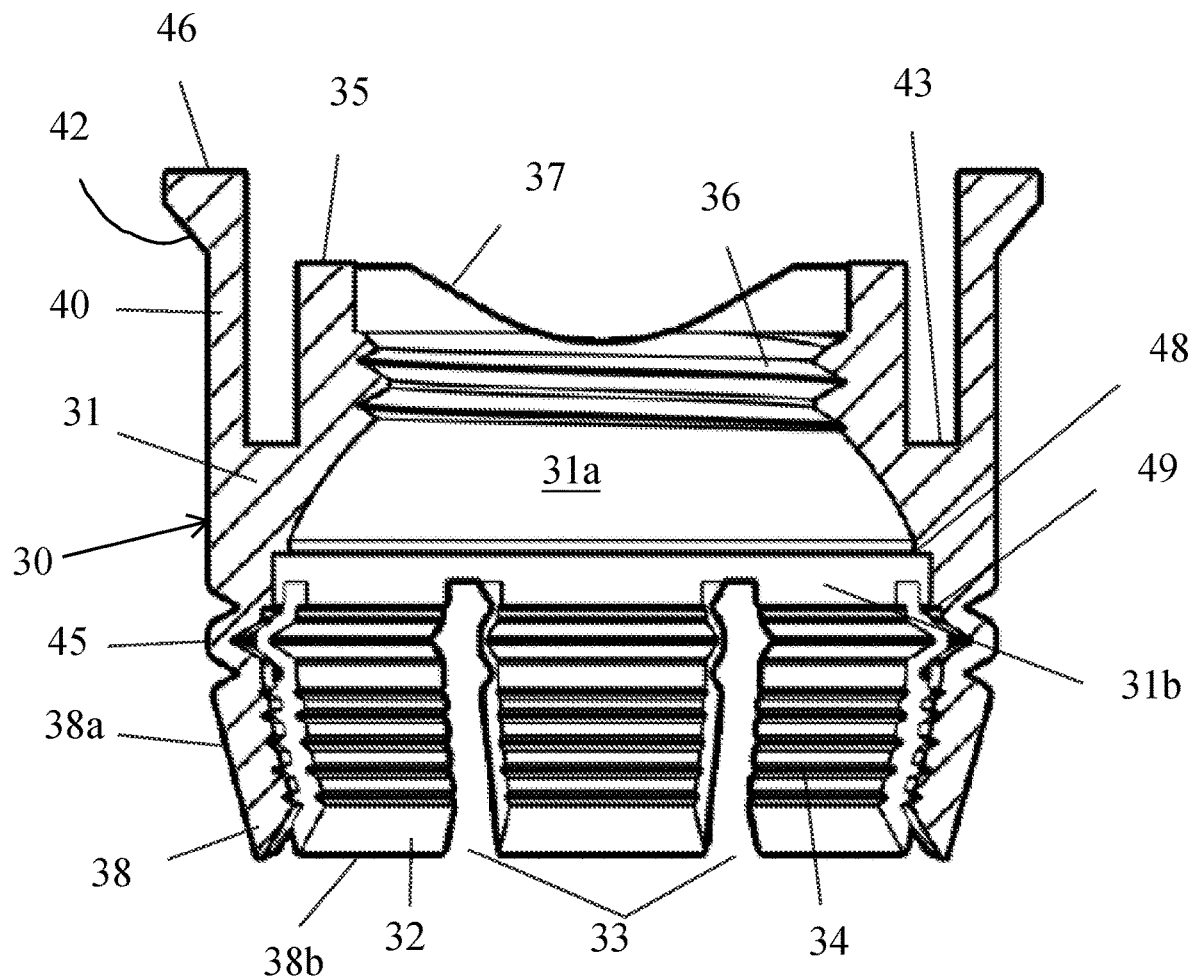
FIG. 2 is a side-cross-sectional view of the cap of the fixation assembly shown in FIG. 1.
Figure 3:
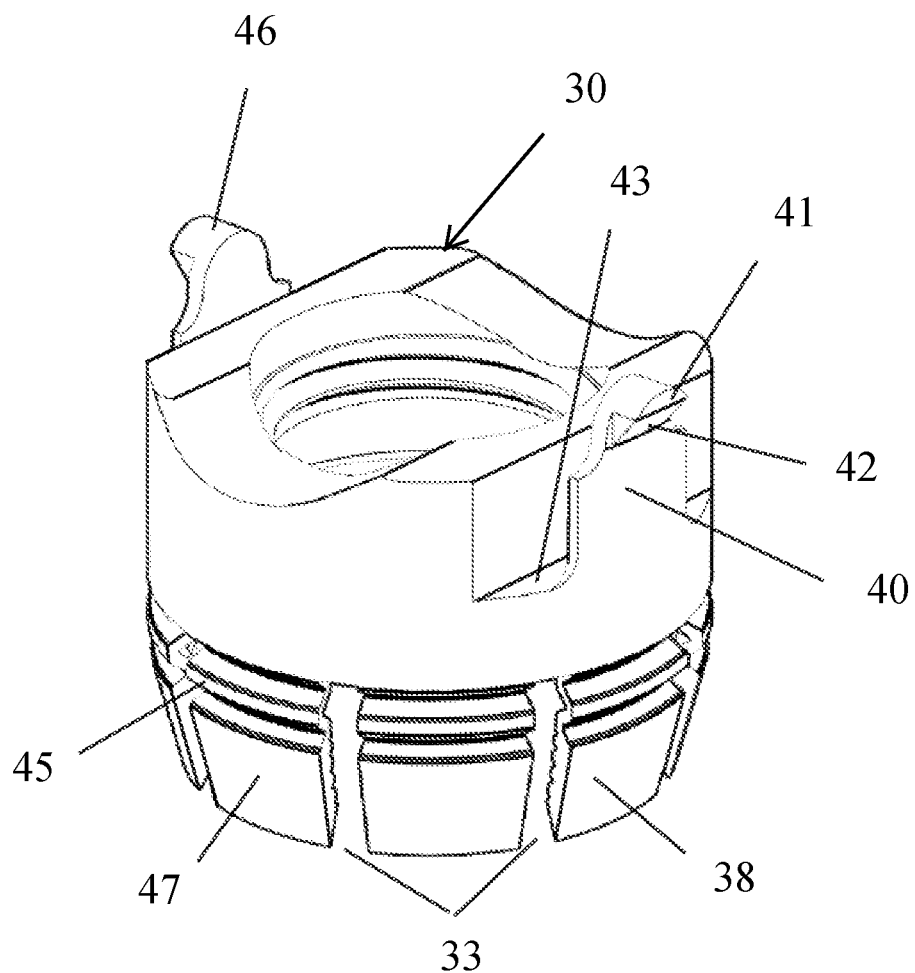
FIG. 3 is a perspective view of the cap shown in FIG. 2.

Referring to FIGS. 1-3, the cap or insert 30 that includes a main body 31 that defines a spherical cavity 31a that is configured to engage the spherical head of a fastener and that extends to a lower opening 32 so that the head of the fastener can be introduced into the cap 30. The insert defines a series of slots 33 between gripping legs 38 that allow the legs 38 to pivot or flex outward, relative to the main body, as the spherical head of a fastener is pressed upward into the spherical cavity 32 of the cap, and to pivot or flex inward as the cap is moved toward the conically tapered wall 14 of the tulip housing 11 so that the outer surface 38a of the legs engage or grip the tapered wall. The bottom of each leg includes an angled face 38b that is contacted by the head of the fastener as it is introduced into the cap, facilitating the outward flexing of the legs. The inner surface of the legs 38 can include an engagement feature 34 configured to enhance the frictional or gripping engagement of the cap onto the fastener head to prevent rotation of the fastener head. The engagement feature 34 can be circumferential ridges, as shown in FIG. 2, or can be knurling or any other feature capable of increasing the frictional or gripping engagement.

In accordance with the present disclosure, the cap 30 includes a cylindrical central hub 35 that defines an internally threaded opening 36 in communication with the spherical interior surface 31. The threaded opening 36 is configured for engagement with an insertion tool and to allow a driving tool to pass through the opening to engage the head of a fastener disposed within the fixation assembly 10. The central hub 35 defines a rod saddle 37 that can be aligned with the rod channel 18 when the cap is inserted into the tulip housing 11. As described herein, the spinal rod is seated on the rod saddle 37 in the fixation assembly 10.

As thus far described, the cap 30 is similar to inserts of prior poly-axial fixation assemblies. In accordance with one feature of the present disclosure, the cap includes a pair of resiliently deflectable wings 40 on opposite sides of the central hub 35, as shown in FIGS. 2-3. The wings are offset from the hub to define a channel 43 therebetween that provides clearance for the wings 40 to deflect inward toward the hub, as described herein. The free end of each wing defines a locking tab 41 that is sized to engage within a locking opening 20, 21 on a corresponding side of the tulip housing 11, as shown in FIGS. 1, 4A-B, 5A-B and 6. The locking tabs 41 include a beveled face 42 that facilitates the release of the tabs from the upper locking opening 20 when the cap 30 is moved deeper into the tulip housing, as described below. The tabs also include an upper face 46 that is substantially perpendicular to the wing 40 that prevents removal of the locking tabs from the locking openings when the cap is moved upward within the housing 11.

In another feature, the legs 38 are connected to the main body 31 of the cap 30 by spring elements 45. In the illustrated embodiments, the spring elements 45 are V-shaped segments that connect the base of the main body 31 to the top of each of the tabs 31. It can be appreciated that the V-shaped elements 45 can be closed or narrowed when the main body 31 moves toward the legs 38. In addition, the spring elements can facilitate the inward and outward flexing of the legs 38 discussed above.

Figure 4A:
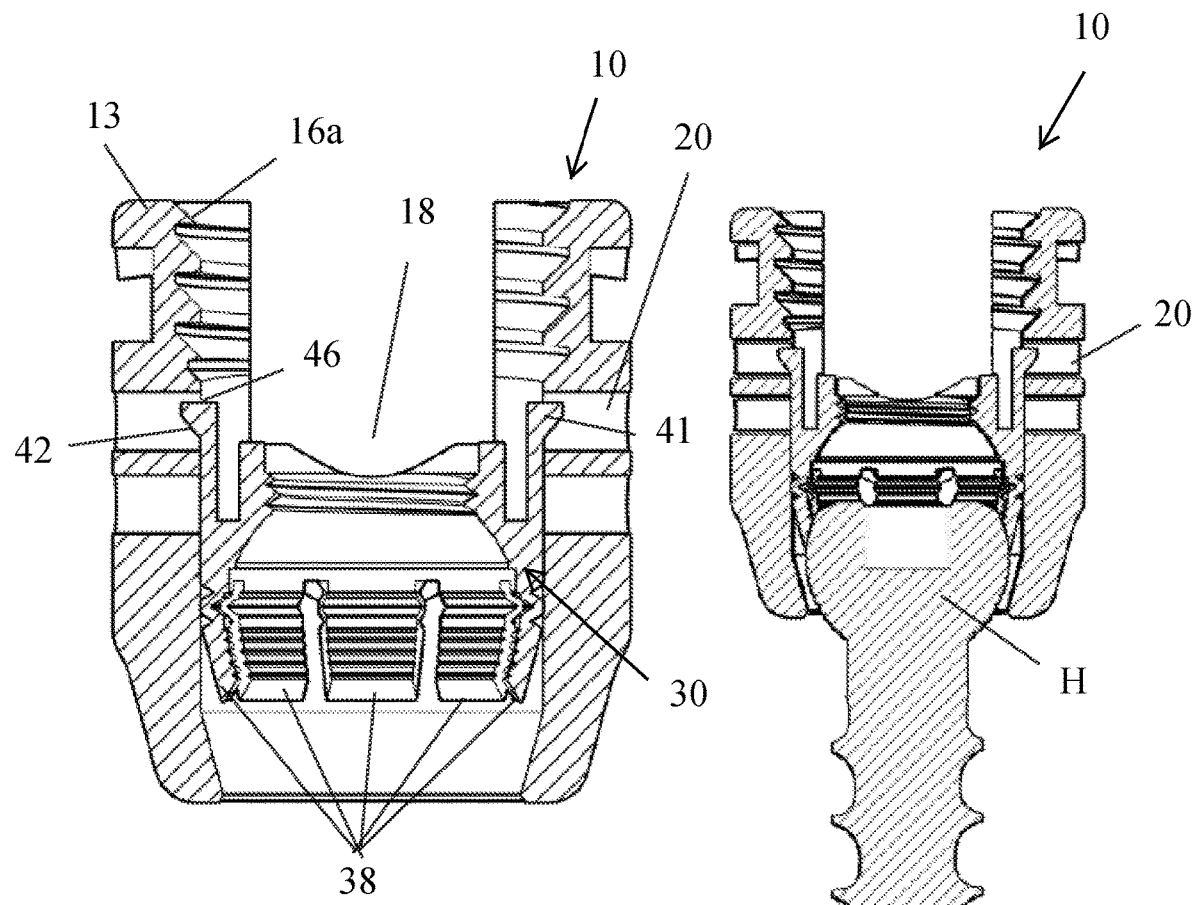
FIG. 4A is a side cut-away view of the fixation assembly in a first unlocked state.
Figure 4B:
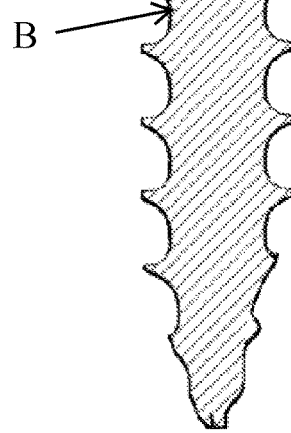
FIG. 4B is the side cut-away view of the fixation assembly in FIG. 4A with a bone engaging fastener included in the assembly.

FIGS. 4A-4B shown the fixation assembly with the tulip housing 11 and cap 30 assembled in an unlocked state of the assembly. The cap 30 is introduced into the tulip housing at the rod channel 18 end of the housing. As the cap is pushed into the housing, the beveled face 42 of the locking tabs 41 passes along the internal threads 16 so that cap does not bind within the upper portion of the housing. As the cap advances farther into the housing, the tabs 41 reach the upper locking openings 20, at which point the tabs flex outward so that the tabs are engaged within the openings. The cap 30 is thus suspended within the housing by engagement of the locking tabs with the housing openings, as shown in FIG. 4A. In this state, the gripping legs 38 are free to flex outwards from the centerline up until they contact the inner wall 12 of the housing. This flexibility is permitted by the slots 33 and spring elements 45.

While in the unlocked state, the outward flexing of the gripping legs permit the insertion of a fastener B, via the spherical head H forcing the legs 38 outward. It can be appreciated that although the outward flexing of the legs is limited by contact with the inner wall 12, as mentioned above, the amount of flexing is sufficient for the spherical head H to be fully seated within the spherical cavity 32 while the cap is suspended within the tulip housing 11. Consequently, the fastener B can also be removed at this time if the surgeon wishes to replace it with another fastener, because the gripping legs are still able to flex outwards in order to release the spherical head.

If the surgeon is satisfied with the choice of fastener, the cap 30, with the head H of the fastener captured therein, can be pushed further into the tulip housing 11. This can be accomplished by an insertion tool that is configured to push on the central hub 30 in a suitable manner. In one approach, the insertion tool can have an externally threaded tip for engagement with the threads of the opening 36.

Figure 5A:
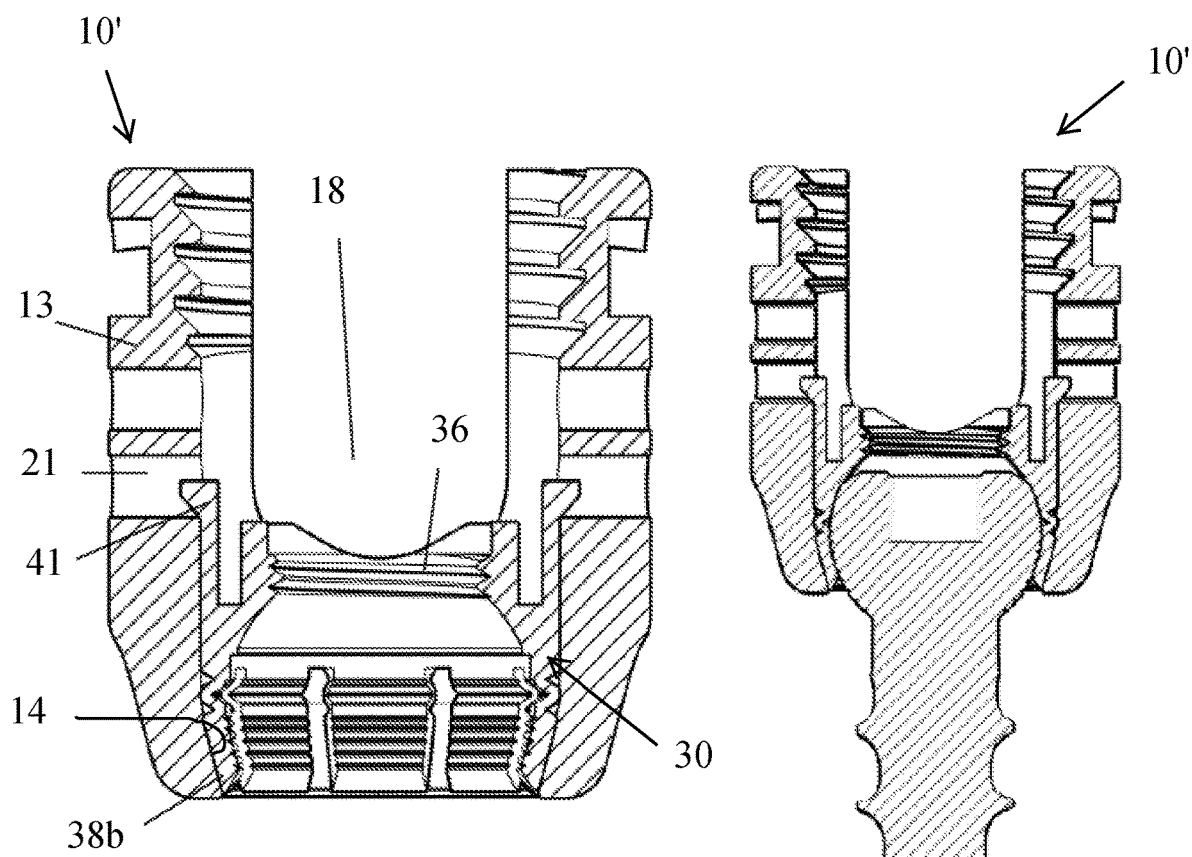
FIG. 5A is a side cut-away view of the fixation assembly in a second locked state.
Figure 5B:
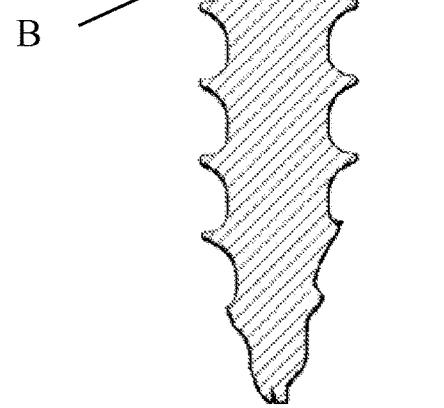
FIG. 5B is the side cut-away view of the fixation assembly in FIG. 5A with the bone engaging fastener included in the assembly.

The cap 30 is pushed into the housing so that the locking tabs 41 disengage from the upper locking openings 20 and then re-engage within the lower locking openings 21, as shown in FIGS. 5A, 5B. When the tabs are engaged in the lower locking openings, the outer surfaces 38a of the legs 38 are in contact with the female conical taper 14 of the housing. This contact prevents further outward flexing of the legs. Moreover, the legs are compressed inward against the spherical head H of the fastener B, which prevents the fastener from being removed or disengaged from the tulip housing 11 of the assembly 10. The assembly is thus in a locked state. Although the orientation of the fastener B relative to the assembly 10 is not fixed, removal of the fastener is prevented because the cap 30 cannot be moved upward. The upper faces 46 of the locking tabs 41 engage the openings so that the cap cannot move upward without some affirmative action to disengage the locking tabs 41 from the lower locking openings 21. In this instance, a tool can press the two locking tabs 41 inward while the fastener B is pushed upward until the upper faces 46 are clear of the openings to dislodge the tabs from the lower locking openings 21. The cap 30 can be returned to the unlocked state of FIG. 4B so that the fastener can be removed.

Importantly, in the locked state, the fastener B can be manipulated, with the spherical head H pivoted within the spherical cavity 32 of the cap 30. Thus, even in the locked state, the assemble components are capable of polyaxial movement as needed to properly orient the rod channel 18 relative to the vertebral body.

Figure 6:
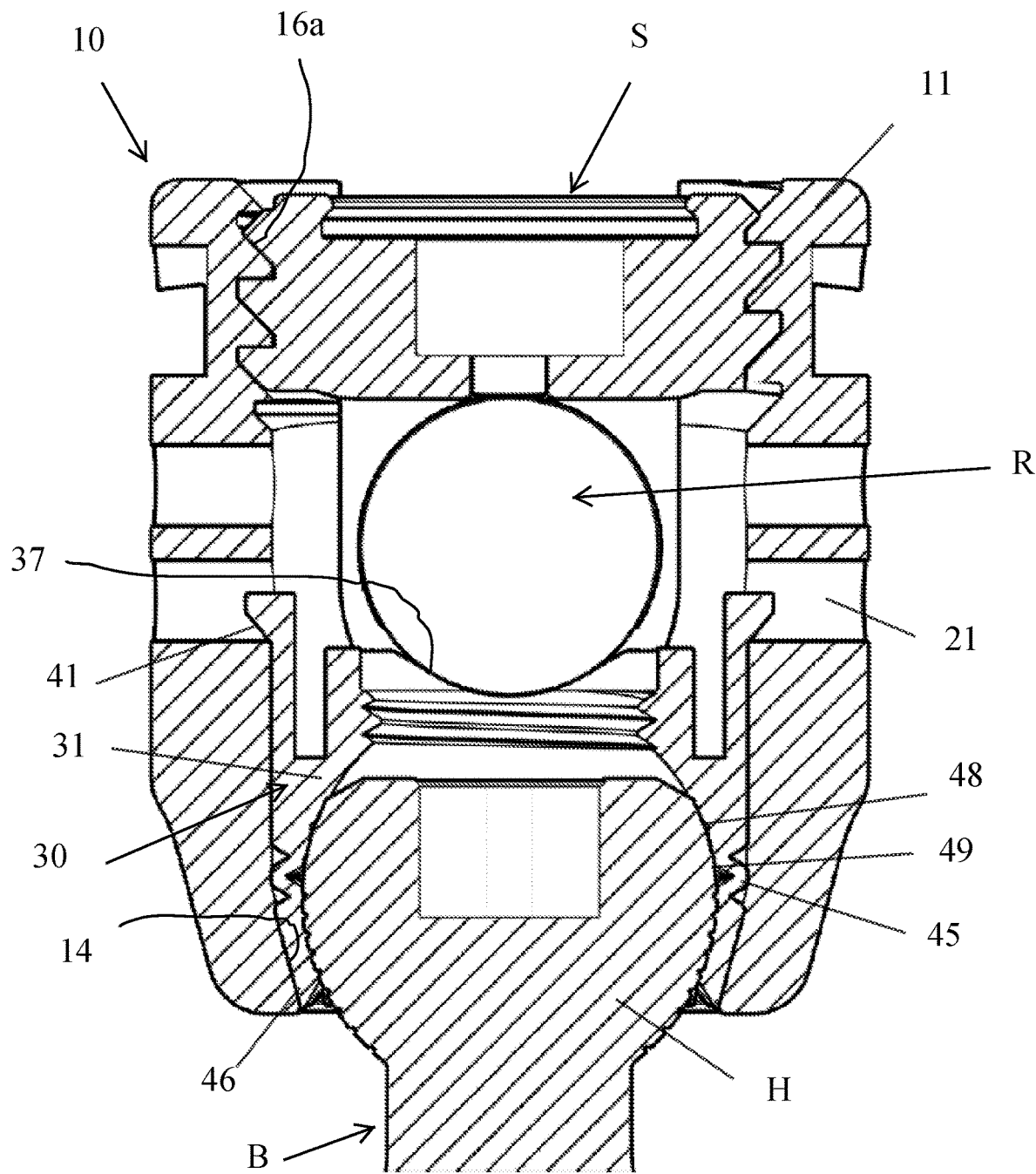
FIG. 6 is a cut-away view of the fixation assembly in its second locked state with a spinal rod and set screw included.

With the fixation assembly in its locked state, the surgeon can position the assembly at the desired location in the spine of the patient, and the bone fastener B can be fastened to the vertebra in a conventional manner. For example, the spherical head H of the fastener can have a hex recess to receive a driving tool that is used to thread the fastener into the vertebral body. The surgeon can freely access the hex recess through the open top of the tulip housing 11, as can be appreciated from FIG. 5B. With the fastener engaged in the bone, the tulip housing can be manipulated as needed to accept a spinal rod within the rod channel 18. The tulip housing and/or rod R can be manipulated until it is seated within the rod saddle 37 of the cap 30, as shown in FIG. 6. The set screw S can then be threaded into the upper threads 16 of the housing in a conventional manner. When assembled with a rod and a set screw, the axial clamping force of the set screw is transmitted via the rod into the rod saddle of the cap. This force causes the gripping legs 38 to be pressed inward via the taper contact between surfaces 38b and 14, tightening the legs 38 and the engagement features 34 into the spherical head H of the fastener. Moreover, this axial force causes the main body 31 of the cap 30 to translate axially downward toward the legs 38, which action is permitted by the flexible nature of the spring elements 45. This axial movement pushes interior edges or circumferential corners 48 and 49 of the spherical cavity 32 of the cap into engagement with the spherical head H of the fastener. These corners 48, 49 thus "dig into" the fastener head H to prevent the fastener head from pivoting relative to the tulip housing 11. The corner 48 is formed by the interface between the spherical cavity 31a and a cylindrical wall 31b, as best seen in FIG. 2. The corner 49 is formed by the interface between the cylindrical wall 31b and the legs 38, or more particularly between the wall 31b and the spring elements 45. The corner 48 is circumferentially continuous, while the corner 49 can be interrupted by the slots 33.

The locking openings 20, 21 can be circular holes through the arms 13 of the tulip housing, with a diameter sufficiently large to permit the locking tabs 41 to have some "play" when they are engaged within the openings. In the unlocked state, this play between the locking tabs and the upper locking openings 20 can allow the cap 30 to move up and down as needed to allow the surgeon to press the spherical head H into the spherical cavity 32 of the cap. Similarly, some play between the locking tabs and the lower locking opening 21 allows for the axial translation of the main body of the cap as the spring elements 45 are flexed. The openings 20, 21 can have other shapes that provided some amount of play relative to the locking tabs, for instance a rectangular shape.

Figure 7:
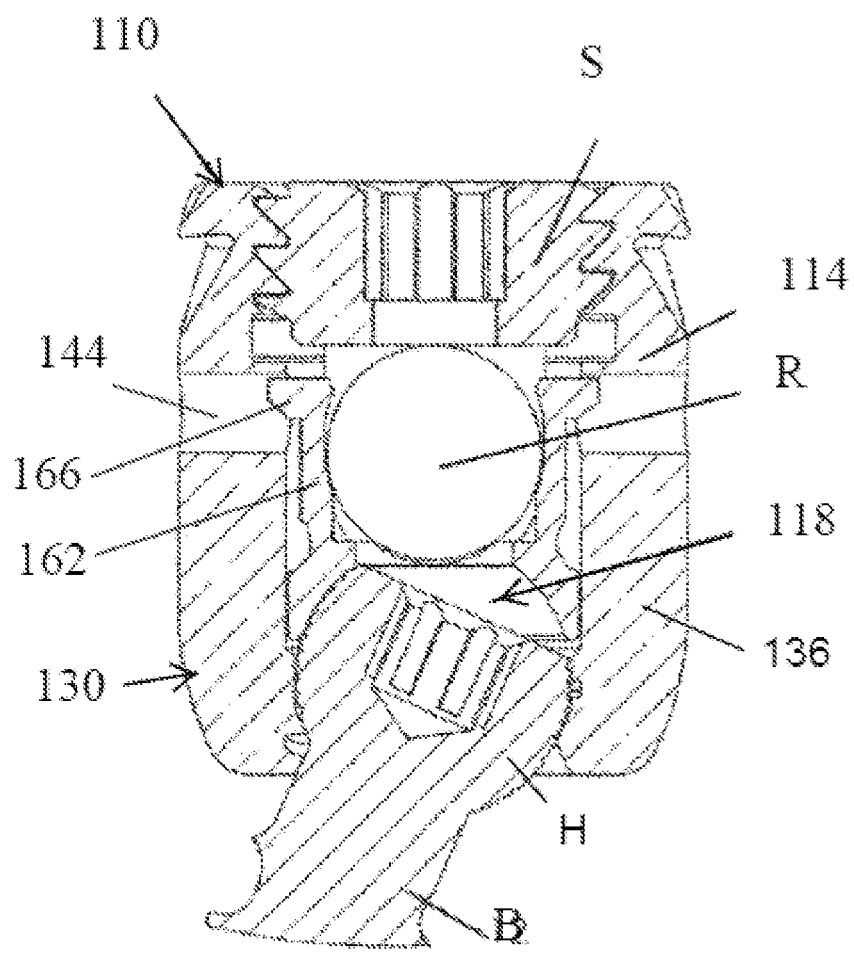
FIG. 7 is a side cut-away view of a prior art fixation system disclosed in U.S. Pat. No. 10,172,647
Figure 8:
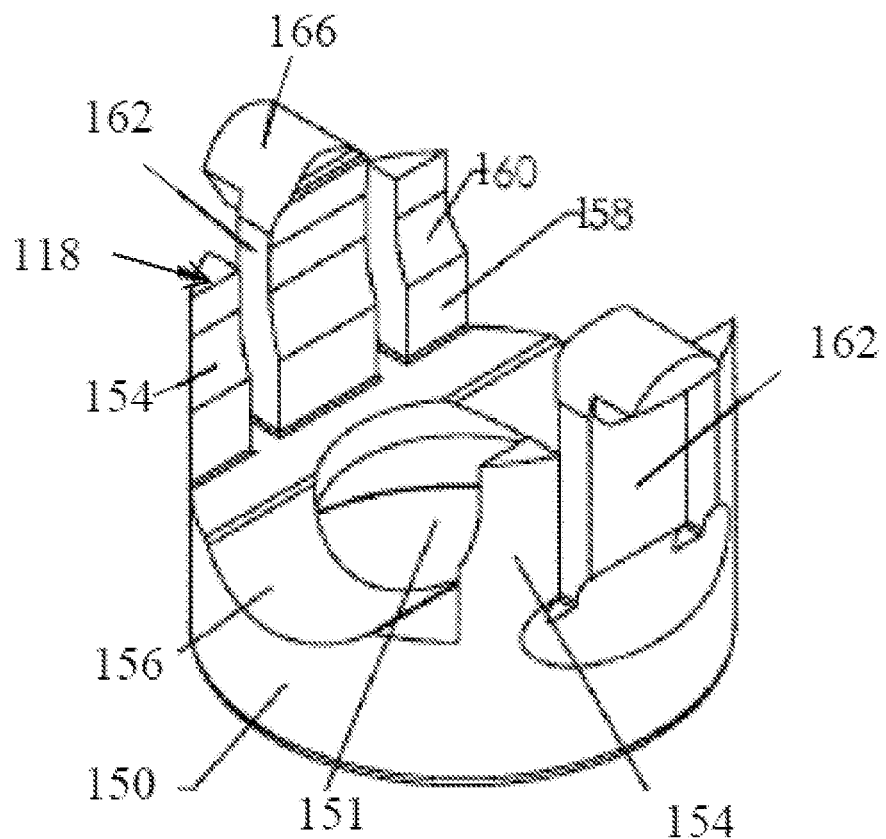
FIG. 8 is an enlarged view of the insert of the prior art fixation system shown in FIG. 7.

It is further contemplated that the cap 30, including the spring elements 45, can be incorporated into other fixation assemblies and other tulip housings. For instance, the cap 30 can replace the insert 118 of the '647 patent shown in FIG. 7.

It is contemplated that the components of the fixation assembly described herein are formed of medical grade materials, such as stainless steel and titanium. Each component—namely, the tulip housing 11 and the cap 30—is preferably formed as a one-piece unitary body. It is thus contemplated that the components may be formed by machining, forging or casting in a conventional manner. Certain features, such as the threads, can be formed in a conventional manner, such as by machining the components.

The present disclosure should be considered as illustrative and not restrictive in character. It is understood that only certain embodiments have been presented and that all changes, modifications and further applications that come within the spirit of the disclosure are desired to be protected.

What is claimed is:

1. A fixation assembly for fixing a spinal rod to a bone engaging fastener with a set screw, the fastener having a spherical head, the assembly comprising:
    a tulip housing defining an inner circumferential wall that extends to a conically tapered wall at an opening at one end of the housing, said opening configured to receive the spherical head of the fastener therethrough, said housing further including a pair of arms at an opposite end of the housing opposite said one end, wherein said pair of arms define;
        a rod channel therebetween configured to receive the spinal rod therein;
        an upper inner surface that merges into said circumferential wall and that includes internal threads configured for threaded engagement with the set screw;
        a pair of upper locking bores that include an upper locking bore in said upper surface of each of the arms that passes through the respective arm to receive a tool from outside said tulip housing; and
        a pair of lower locking bores that include a lower locking bore in said upper surface of each of the arms that passes through the respective arm to receive a tool from outside said tulip housing, said pair of lower locking bores disposed between said pair of upper locking bores and said one end of said tulip housing; and
    a cap configured for insertion into said tulip housing at said opposite end when the spherical head of the fastener is within said tulip housing at said one end, said cap including;
        a main body defining;
            a spherical cavity sized to receive the spherical head of the fastener therein; and
            a saddle configured to receive the spinal rod therein when the rod is disposed within said rod channel of said housing;
        a plurality of legs extending from one end of said main body, said plurality of legs separated by slots so that said plurality of legs can pivot relative to said main body, said plurality of legs including;
            an inner surface configured to engage the spherical head of the fastener when the spherical head is disposed within said spherical cavity; and
            an outer surface configured to engage said conically tapered wall of said tulip housing; and
        a pair of resiliently deflectable wings extending from an opposite end of said main body, each of said wings including an outwardly projecting locking tab at a free end thereof, said locking tab of each of said wings configured to be disposed within a corresponding bore of said pair of upper and lower locking bores,
    wherein said cap is slidably disposed within said inner circumferential wall of said housing to move between an unlocked state in which said locking tab of each of said pair of wings is engaged in a corresponding bore of said upper locking bores and a locked state in which said locking tab of each of said pair of wings is engaged in a corresponding bore of said lower locking bores, and
    wherein said locking tab and said corresponding bore are configured so that said locking tab of each of said wings is accessible by a tool through said corresponding bore to deflect said pair of resiliently deflectable wings towards each other to release said locking tab from said corresponding bore.

2. The fixation assembly of claim 1, wherein said locking tab of each of said pair of wings includes a beveled face angled toward said main body, said beveled face configured to deflect the corresponding wing inward as the beveled face moves downward, relative to said opening of said housing, at a corresponding one of said upper and lower locking bores.

3. The fixation assembly of claim 2, wherein said locking tab of each of said pair of wings includes an upper face that is substantially perpendicular to the corresponding wing, said upper face configured to prevent disengagement of said locking tab from a corresponding one of said upper and lower locking bores openings when said cap is moved upward relative to said opening of said housing.

4. The fixation assembly of claim 1, wherein said cap includes a central hub defining said rod saddle and a hub opening in communication with said spherical cavity, said central hub offset from each of said pair of wings to define a channel therebetween to permit each of said pair of wings to deflect inward toward said central hub.

5. The fixation assembly of claim 4, wherein said hub opening includes internal threads.

6. The fixation assembly of claim 1, wherein said inner surface of each of said plurality of legs includes an engagement feature configured to increase the frictional or gripping engagement between each of said legs and the spherical head of the fastener.

7. The fixation assembly of claim 6, wherein said engagement feature includes circumferential ridges defined in said inner surface.

8. The fixation assembly of claim 1, wherein said cap includes a spring element between said main body and each of said plurality of legs configured to permit each of said plurality of legs to pivot relative to said main body.

9. The fixation assembly of claim 8, wherein said spring element associated with each of said plurality of legs is configured to compress axially as the main body is translated toward each of said plurality of legs.

10. The fixation assembly of claim 8, wherein said spring element is a V-shaped element connecting the corresponding leg to said main body.

11. A cap configured for insertion into a tulip housing of a fixation assembly, the fixation assembly configured for fixing a spinal rod to a bone engaging fastener with a set screw in which the fastener has a spherical head and the tulip housing defines an inner circumferential wall that extends to a conically tapered wall at an opening at one end of the housing, said cap comprising:
    a main body configured for insertion into said tulip housing, said main body defining;
        a spherical cavity sized to receive the spherical head of the fastener therein; and
        a saddle configured to receive the spinal rod therein;
    a plurality of legs extending from one end of said main body, said plurality of legs separated by slots so that said plurality of legs can pivot relative to said main body, each of said plurality of legs including;

an inner surface configured to engage the spherical head of the fastener when the spherical head is disposed within said spherical cavity; and an outer surface configured to engage said conically tapered wall of said tulip housing; and a spring element connecting said each of said plurality of legs to said main body, said spring element configured to permit said each of said plurality of legs to pivot relative to said main body.

12. The cap of claim 11, wherein said spring element associated with each of said plurality of legs is configured to compress axially as the main body is translated toward each of said plurality of legs.

13. The cap of claim 12, wherein said spring element is a V-shaped element connecting the corresponding leg to said main body.

14. The cap of claim 11, wherein said main body defines at least one circumferential corner between said spherical cavity and said plurality of legs, said at least one circumferential corner configured to engage the spherical head of the fastener within the spherical cavity when the main body is translated toward the plurality of legs.

15. A cap configured for insertion into a tulip housing of a fixation assembly, the fixation assembly configured for fixing a spinal rod to a bone engaging fastener with a set screw in which the fastener has a spherical head and the tulip housing defines an inner circumferential wall that extends to a conically tapered wall at an opening at one end of the housing, said cap comprising:

a main body configured for insertion into said tulip housing, said main body defining;
  a spherical cavity sized to receive the spherical head of the fastener therein; and
  a saddle configured to receive the spinal rod therein;
a plurality of legs extending from one end of said main body, said plurality of legs separated by slots so that said plurality of legs can pivot relative to said main body, each of said plurality of legs including;
an inner surface configured to engage the spherical head of the fastener when the spherical head is disposed within said spherical cavity; and
an outer surface configured to engage said conically tapered wall of said tulip housing; and
a spring element connecting said main body to each of said plurality of legs, said spring element configured to permit each of said plurality of legs to pivot relative to said main body,
wherein said main body further defines two circumferential corners axially offset from each other between said spherical cavity and said plurality of legs, each circumferential corner configured to engage the spherical head of the fastener within the spherical cavity when the main body is translated toward the plurality of legs.

16. The cap of claim 15, wherein said spring element associated with each of said plurality of legs is configured to compress axially as the main body is translated toward each of said plurality of legs.

17. The cap of claim 16, wherein said spring element is a V-shaped element connecting the corresponding leg to said main body.

* * * * *